UNITED STATES PATENT OFFICE 2,016,199

DRYING REACTION PRODUCT OF UREAS AND ALDEHYDES

Arthur M. Howald, Pittsburgh, Pa., assignor to Toledo Synthetic Products, Inc., Toledo, Ohio, a corporation of Ohio No Drawing. Application July 9, 1932, Serial No. 621,758. In Canada September 13, 1929

15 Claims. (Cl. 260—3)

This invention relates to drying reaction products of ureas and aldehydes; and it comprises a method of quickly drying moist reaction products of ureas and aldehydes to arrest reaction and obtain the materials in dry, stable and easily handled form wherein such products in a sirupy, gelatinous or gummy form are subjected to a treatment removing a part of the water without the use of high temperatures or long continued heating, placing them in a solid form in which they can be comminuted and dried, this treatment usually comprising subjecting the materials while hot to a sudden reduction of pressure to cause internal evolution of vapors thereby producing, cooling and partial drying, the cooled vesiculated material being ground to a powder and the powder dried, usually by air drying; all as more fully hereinafter set forth and as claimed.

Ureas and aldehydes in aqueous solution react together; sometimes energetically and with the evolution of considerable heat. The nature of the chemical actions involved is not known with any exactitude, but they are complex and are accelerated by the presence of any free acid. Alkalies also catalyze the action, but in this case the action does not become violent and follows a somewhat different course. Apparently, the first action in either case is condensation, followed by progressive polymerization; but condensation and polymerization overlap in point of time, particularly in acid solutions. The first products are crystalline, water-soluble bodies, probably of simple constitution; but as polymerization goes on, colloid systems develop, the liquid becoming sirupy, gelatinous and gummy, with ultimate solidification to solid gels. These solid gels have, probably, the usual honeycomb structure, so far as the solids are concerned, with water in the pores. These gells, after removal of water, can be converted into stable and permanent resins by further polymerization under heat.

Many of the final resins which can be formed by hot molding partially reacted materials have interesting and useful properties. This is particularly true of the resins from formaldehyde and urea, which, properly made, are pale, transparent substances, much like glass, and are useful in making various articles, both alone and as binders for molding powders. Regular production of material suitable for making commercial articles is an important technical problem. The difficulties lie in control of conditions and, while they are most serious in the case of formaldehyde and urea, they are substantial with thiourea and the various alkyl and aryl substituted ureas, as well as with other aldehydes.

For satisfactory commercial production of high grade molded articles from urea-formaldehyde reaction products it is necessary to provide a dry stable preparation which can be shipped and stored without deterioration, but which in the mold will at first flow sufficiently "to fill the mold" and will then solidify as a whole without extrication of gases or vapors. To make such a preparation it is necessary to arrest or interrupt the continuous series of actions described at a point where the material is still fusible, removing the water and excess formaldehyde without carrying the reaction on beyond this point.

Most of the difficulties of control lie in the removal of water; the water necessary in the first stage must be removed in the second stage: manufacture of a dry preparation. Removal of water from the gel by heat, or long exposure to air, or both, is attended with a further progress of reactions. No control of these actions is possible while water is still present: that is during drying. It is desirable to arrest the reactions depending upon the presence of water when the first condensing actions are over; dropping the temperature and removing the water quickly and leaving a stable, dry material in which the further polymerization incident to molding can be instituted at pleasure and under the best conditions. The present invention looks toward this end.

In this invention water is removed in three different ways used consecutively thereby attaining a better total drying with less risk of injury to the sensitive urea-formaldehyde reaction products. Part of the water is removed by a flash evaporation after the customary removal of part of it by ordinary evaporation. In the most advantageous embodiment of this invention, the heating actions, with incident evaporation, are carried forward to a stage where the hot material is still liquid enough to flow but will become solid on cooling. Some of the remaining water is then flashed into vapor by a sudden reduction in pressure, thereby cooling the material to the solidifying point. The solid film thereby formed is ground and the rest of the remaining water is then removed by ordinary drying methods applied to the powder. Incidentally, excess formaldehyde is also removed effectively in the 3-stage drying.

While the present invention is applicable to other ureas and to other aldehydes, it will be here discussed more particularly with reference to formaldehyde and urea. As stated, alkalies or bases as catalysts give a more controllable action than acid and they are customarily used in most of the proposed and patented processes. In practice, an excess of formaldehyde is generally used; that is, 2 molecules or more of formaldehyde for each molecule of urea. This excess tends to slow down actions and make operation more controllable. However, it is generally recognized that some, or much, of this formaldehyde must be removed prior to making the final resins. The necessity for removal of formaldehyde, as well as of water, rather complicates the usual methods of handling the gels prior to resinification. The gels are mostly of a rubbery consistency and cannot readily be comminuted or dried. Extrication of water and formaldehyde through the ultramicroscopic pores of a gel is extremely difficult. In the older practice, where gels were baked for a long time, the turnery stock produced would still evolve stifling vapors of formaldehyde when worked on the lathe.

For another thing, it is found in practice that, while alkali is desirable in the preliminary stages of condensation, in the final polymerization to make resins, the action is better in the presence of acid. In fact, the whole process requires an accurate control of pH value from time to time to obtain good results.

I have discovered that I can arrest all reactions by the particular procedures described; producing a dry, stable material which can be packaged, stored, etc., and which may be regarded as, so to speak, an "intermediate", ready for use in various methods. The chemical reactions are merely arrested by the absence of water.

In what I regard as the best embodiment of my invention, one step is vesiculating a warm, moist mass of sirupy, gelatinous or gummy reaction products by a sudden release of pressure, forming vapors and gases which blow the mass up into a porous body; a foam or froth. Evolution of vapor is attended with a drop in temperature; and the release of pressure step should occur at a stage of reaction whenever the cooling will be sufficient to produce solidification. With proper vesiculation, the material now exists as thin solid films; bubble walls, so to speak, exposing an indefinitely great surface area. The foam is then ground to a fine powder and this is dried in any convenient way; but generally by simple exposure to warm air. In drying, it is not ordinarily desirable that the material become hotter than about 80° C.; but the air can be hotter, as long as moisture remains.

The fine powder obtained by grinding can be effectively freed from residual moisture and of much, or most, of the excess formaldehyde which is generally used, by a short drying. It still possesses chemical reactivity; the extent of this, of course, depending on the particular stage of reaction where arrest takes place. And it always possesses what may be called residual plasticity; polymerization has not gone forward to the production of the final glassy resin. Complete polymerization to produce resins can be effected in one or more stages by suitable heating. The pulverulent form of the dry material makes convenient an intermixture of fillers in manufacturing molding powders to be consolidated under heat and pressure. If the reaction which was arrested was under alkaline conditions and it is desired to polymerize under acid conditions, dry acids (oxalic, phthalic, etc.) can be mixed with the dry powder. The dry powder is also convenient in making composite resins; resins of other types admixed with aldehyde-urea resins.

Where excess formaldehyde is used in the preliminary condensation, much of this is removed during the drying. The fine particles given by grinding are generally themselves more or less vesicular and an extremely large surface is afforded for removal of gases and vapors. However, where formaldehyde remains in the dry material in excess of what is wanted, it can be corrected at this time by a physical admixture of fine powdered urea, thiourea, resorcinol, etc. On the other hand, if more formaldehyde is required than is left, commercial polymerized aldehyde ("paraform") can be admixed.

The described procedure can be applied to any reaction product at any time when it still possesses sufficient viscosity to enable it to be blown into a foam. If the reaction mixture is one where temporary high temperature is unimportant, the material while still liquid can be heated under pressure to a temperature over 100° C. and released in air. Or, it can be heated and released in vacuo, as described in my prior application, Serial No. 363,412, filed May 15, 1929. If the amount of moisture and of gasifiable formaldehyde is too small to give good vesiculation under pressure and temperature conditions which happen to be convenient, the amount of vapor can be augmented by admixing the liquid with alcohol. Either methyl or ethyl alcohol is convenient. Both are miscible, both have low boiling points and neither has any chemical action.

In the described operation, it will be noted that removal of water takes place in two stages: first, by sudden internal development of vapors forming foam and, second, by drying the new surfaces produced. Ordinarily, the greater proportion of the water must be removed in the air drying step. Flash evaporation of a small proportion of the water present is sufficient to vesiculate the mass.

In a specific embodiment of the present invention, I can make formaldehyde-urea resins by the general procedure in the acknowledged prior application. In this particular procedure, there is a methodical control of pH conditions and the initial reaction is in a very slightly acid solution. Commercial aqueous formaldehyde in the usual 35–40 per cent solution, which is always more or less acid, is partially neutralized. A good base for neutralizing is triethanolamine, since its presence does not complicate reactions. A pH of 6.6 is suitable. To an amount of formaldehyde solution containing 10.3 parts by weight of formaldehyde, I add 7 parts by weight of good commercial urea. The liquid is filtered, if necessary, to remove undissolved foreign matter. With a pH of 6.6, reaction is slow and I therefore heat the liquid to boiling, using a reflux condenser. Heating is stopped when the liquid reached a boil and spontaneous boiling allowed to take place as long as it will. I then add 2 parts by weight of urea and apply heat to maintain the boiling for about 30 minutes longer. The liquid is then concentrated by evaporation in an open pan until it loses about 40 to 45 per cent by weight. At this time, it is a hot, thick sirup. This sirup is now made very slightly alkaline, the best pH being about 7.3. In making resins by this process, I desire a ratio of formaldehyde to urea in the final product rather closely approaching the molecular ratio 1.5:1. To take care of the formaldehyde now remaining in the material over and above this ratio, I now add urea or thiourea in the proportion of 0.5 molecule for each molecule of excess formaldehyde. The proportion of excess formaldehyde present varies somewhat in different operations, owing to losses in boiling and concentrating, and the exact amount of thiourea to be added is best determined by analysis each time, if the conditions are changed materially. Mostly, with the quantities indicated, an addition of about 2.5 parts of thiourea at this time is right. After the addition of thiourea, the sirup is boiled for about half-an-hour, stirring with an air jet. It is then cooled to about 60° C. and the pH adjusted to the desired point by the addition of an acid, such as phthalic anhydrid. A pH between 5 and 3 is suitable. It is convenient to add the phthalic acid in the form of a somewhat acid resin of the "glyptal" type; resinified mixtures of phthalic anhydrid and glycerin. The resin may be dissolved in or softened by alcohol. A preparation containing about 20 per cent ethyl alcohol is convenient. Or, I may cool the sirup to about 60° C. and add some alcohol; say 20 per cent.

The alcohol mixes readily with the thick sirup. The alcoholic sirup is then introduced into a vacuum drier, whereupon it rapidly puffs up to a porous solid mass. This solid mass is then fine ground and dried to remove remaining alcohol and water. Unless the excess formaldehyde has been disposed of as stated, some formaldehyde will be lost at this time.

Instead of cooling to 60° C. and admixing alcohol, the sirup at a temperature around 108–110° C. may be introduced into a vacuum chamber and allowed to puff up by the extrication of water vapor. It may be heated under pressure to a still higher temperature before being released in vacuo; but this is not usually necessary.

Vesiculation may be used in any of the current processes condensing in the presence of ammonia or other alkali and forming a hot, thick, alkaline sirup which will puff up in vacuo to produce a solid vesicular mass. This mass is then fine ground. When alkalization is with ammonia or a volatile base, some of the alkali is lost in the flash evaporation. In any event, with alkaline operation, it is commonly desirable to admix dry powdered acid with the dry powder obtained on grinding; the amount being equivalent to a pH between 3 and 5. Phthalic acid, tartaric acid and salicylic acid are all suitable.

In another embodiment of my invention, condensing in alkaline solution, I take 2 parts by weight of commercial formaldehyde solution containing 40 per cent formaldehyde and make it alkaline with 5 parts by weight of commercial 20 per cent ammonia. This forms hexamethylenetetramin which, however, for my purpose is equivalent to ammonia and formaldehyde. To the alkaline liquid, I add 60 parts by weight of urea. The proportions given include more formaldehyde than is really necessary; there is an excess. When the urea is completely dissolved, which takes place with some cooling, the solution is heated under a reflux condenser, instituting an exothermic reaction. Boiling is continued, using heat when necessary, until a sample of the mass on cooling does not appear turbid. The solution, alkaline with ammonia in the beginning, becomes progressively less alkaline during the heating process as the ammonia enters into combination until a pH value of around 4.4 is reached. The liquid is then heated, using a vacuum if desired, until it becomes of sirupy character. The temperature is then brought to 110° C., or thereabouts, and the hot mixture allowed to flow into a vacuum chamber. As it passes inward, it puffs up and becomes a light, vesiculated solid. This is ground to a fine powder and dried. The thoroughly dry material is heated to about 60° C. and compressed into molds. Baking at this temperature is continued until the material is converted into a glassy solid body suitable for lathe stock or directly useful as an article.

In the foregoing example, equivalent quantities of thiourea may be substituted for the urea. Or, an aryl urea, such as phenyl urea, or an alkyl urea, such as methyl urea, may be substituted for ordinary urea in equivalent amounts.

In a third embodiment of my invention, I take 6 parts by weight of commercial formaldehyde solution containing 40 per cent of formaldehyde and in it I dissolve 1 part by weight of urea, and heat the solution in a distilling vessel until nearly one half of the liquid has been distilled off. The mass is then allowed to flow into a vacuum chamber, where it puffs up and becomes a light vesiculated solid similar to that obtained according to the second embodiment. The solid is comminuted and further dried. As there is some excess of formaldehyde even after distillation, it is advisable to add sufficient urea or thiourea to the mass, either just before puffing, or during the operation of comminution, to neutralize the formaldehyde.

The dry powder produced as described may be mixed with wood pulp, asbestos, etc., prior to compression and molding. Wood flour gives a good translucent lathe stock readily worked and machined.

What I claim is:

1. As an improvement in the production of dry, fusible reaction products of urea and formaldehyde in an arrested state of reaction, the process which comprises carrying forward a reaction between urea and formaldehyde in aqueous solution with simultaneous evaporation of water as long as ready evaporation occurs and until a syrup is formed capable of solidifying on cooling, subjecting the syrup in a relatively hot condition to a sudden reduction in pressure, the reduction being sufficient to cause internal development of bubbles and cooling of the syrup to the solidifying point, cooling and grinding the vesiculated mass so formed and drying to remove residual volatiles to an extent sufficient to give a sound molding powder.

2. In the conversion of aqueous syrupy reaction products of urea and formaldehyde into molding powders, the improvement which comprises boiling off water from the syrup until a product solidifiable on cooling is obtained, flash evaporating another portion of the water from the syrup by a sudden reduction in pressure to produce a vesiculated mass, grinding said mass to a powder and removing a further portion of volatiles by air drying.

3. In the process of claim 2, facilitating flash evaporation by incorporating alcohol in the syrup prior to the reduction in pressure.

4. The process of claim 2, wherein the boiled syrup contains a major portion of dissolved fusible condensation product and a minor portion of water.

5. The process of claim 2, wherein the water and other volatiles removed in the second and third steps are removed at temperatures below 70° C.

6. The process of claim 2, wherein the powder is dried in warm air.

7. The process of claim 2, wherein the said reduced pressure is substantially below atmospheric pressure.

8. The process of claim 2, wherein the thickened syrup before being subjected to said reduced pressure is acidified to a pH between 3 and 5.

9. The process of claim 2, wherein the concentrated syrup at a temperature of approximately 60° C. is subjected to reduced pressures substantially below atmospheric pressure.

10. The process of claim 2, wherein said syrup mixed with a volatile alcohol is gradually introduced into an evacuated chamber.

11. An improved powder, suitable for use in hot molding methods and capable of admixture with fillers, said powder being free of substances volatilizable under hot molding conditions, said powder comprising a dry fusible mass of a granular resinifiable reaction product of formaldehyde and urea in a molecular ratio of approximately 1.5:1.

12. The product of claim 11, wherein said powder has an acidity equivalent to a pH between 3 and 5 and is capable of accelerated heat-hardening when hot pressed.

13. As an improved resinifiable urea-formaldehyde reaction product, a friable, open-textured, porous, fusible material, said product being capable of conversion into a completely dried powder without sacrifice of its fusibility and heat-hardening properties.

14. As a new product a resinifiable friable, open-textured, porous, fusible condensation product of urea and formaldehyde, said product being easily reducible to a powder and capable of substantially complete desiccation, at temperatures insufficient to convert the fusible product into an infusible resinous state.

15. In the manufacture of dry stable condensation products of urea and formaldehyde at an arrested stage of internal action, the process which comprises reacting urea and formaldehyde in aqueous solution and removing part of the water by evaporation till a hot solidifiable mass is obtained, puffing up the mass to produce a cool vesicular solid by a sudden release of pressure causing flash evaporation of part of the contained water, grinding up the vesicular solid to a fine powder with extended surfaces and completing the drying by ordinary air drying.

ARTHUR M. HOWALD.